United States Patent [19]
Moradell et al.

[11] Patent Number: 5,813,648
[45] Date of Patent: Sep. 29, 1998

[54] POSITION LOCKABLE SLIDE RAIL FOR MOTOR VEHICLE SEATS

[75] Inventors: Pierre Moradell, St-Gregoire Du Vievre; Dominique Folliot, Flers, both of France

[73] Assignee: Bertrand Faure Equipments S.A., Boulogne Cedex, France

[21] Appl. No.: 596,388

[22] Filed: Jan. 31, 1996

[30]     Foreign Application Priority Data

Feb. 3, 1995 [FR] France ................................ 95 01414

[51] Int. Cl.⁶ ................................................ F16M 13/00
[52] U.S. Cl. .......................................................... 248/424
[58] Field of Search ................................ 248/424, 429, 248/430; 296/65.1

[56]             References Cited

U.S. PATENT DOCUMENTS 4,733,845  3/1988  Maiwald ............................. 248/429
4,781,354  11/1988  Nihei et al. ...................... 248/424 X
5,167,393  12/1992  Hayakawa et al. .................. 248/430

FOREIGN PATENT DOCUMENTS

| 0 349 918 | 1/1990 | European Pat. Off. . |
| 30 14 300 | 10/1981 | Germany . |
| 39 35 359 | 5/1991 | Germany . |
| 43 01 241 | 7/1994 | Germany . |
| WO 86/00857 | 2/1986 | WIPO . |

*Primary Examiner*—Ramon O. Ramirez
*Attorney, Agent, or Firm*—Pollock, Vande Sande & Priddy

[57]                ABSTRACT

The male section (3) is locked onto the female section (1) of the slide rail by means of a lock (21) comprising longitudinal locking means (25, 45), cooperating, in the locked position, with a toothing (17) provided on both flanges (7) of the channel section, constituting the female section, and side retaining means (47), which trap the edges of the flanges (7) so as to keep them from moving apart.

Particular applicability: slide rails for motor vehicle seats.

18 Claims, 2 Drawing Sheets

POSITION LOCKABLE SLIDE RAIL FOR MOTOR VEHICLE SEATS

BACKGROUND OF THE INVENTION

FIELD OF THE INVENTION

The present invention relates to a position lockable slide rail for motor vehicle seats, and more particularly for front seats.

Such seats are mounted on slide rails for their lengthwise adjustment and they must be capable of a firm locking, whatever their adjusted position may be, so as to avoid any lengthwise motion, even in the case of a strong impact. Therefore, the position locking systems of such slide rails must exhibit the highest possible mechanical strength in the sliding direction.

Various locking systems are already known, which are generally based on the principle of engaging a lock, connected to the moving part of the slide rail (such moving part being fastened to the seat), with a toothing provided on the stationary part, integral with the vehicle floor. The lock is conventionally kept in the locked position, that is in gear with said toothing, using spring return means, whereas the unlocking operation is controlled by a lever, the actuation of which disengages the lock from the toothing and enables the rail to slide and its position to be adjusted.

Thus slide rails, composed of a male section and of a female section, sliding in one another, are well known. The male section, in the general shape of a "U", comprises on one side, constituting flange of the channel section, a series of teeth and the lock, carried by an arm, pivoted on the female section, comprises a plate provided with several openings, which fit onto said teeth for the required lengthwise locking. In such a system, longitudinal stresses are transferred between both channel sections, through the lock carrying arm, and the ever-growing requirements as regards the resistance to such longitudinal stresses lead to the reinforcement of the locking parts and therefore to their growing heavier, which goes against the common desire to lighten the vehicle.

Moreover, such slide rail systems imply that the female section, in the shape of a U, be open all along its length. In order to prevent this channel section from opening out, owing to the moving apart of its flanges in the case of transverse or vertical stresses, complex profiles must be adopted, of the type named "iron in gear", for ensuring the latching of the channel flanges on the male section sides.

BRIEF DESCRIPTION OF THE INVENTION

It is the object of the present invention to provide a slide rail, having, in the locked position, a high strength in the longitudinal direction, as well as a better resistance to a moving apart of the female section flanges under a tear stress.

For accomplishing the above-mentioned objects, the invention provides a slide rail for a vehicle seat, comprising a female section in the shape of a U, having two flanges, and a male section sliding lengthwise between said flanges in said female section, and a lock for longitudinally locking the male section on the female section, characterized in that the female section comprises two rows of teeth, provided on each one of its flanges, respectively, said lock is connected, in the longitudinal direction, to the male section and includes longitudinal locking means arranged so as to cooperate in a locked position, with teeth of said two rows of teeth, for preventing a relative longitudinal movement of the male and female sections, and side retaining means, provided so as to trap, in said locked position, the female section flange edges, in order to keep said flanges from moving apart.

With the invention, not only the longitudinal locking is improved, owing to the fact that the lock fits onto both rows of teeth of the female section, but also at the same time, any moving apart of the flanges of this section is prevented by side retaining means, arranged on the lock, as soon as it is in the locking position. Thus the overall strength of the slide rail and of the locking system is greatly improved, more particularly when the vehicle is subjected to impacts, which exerts tear stresses on the seat, tending to pull it away from the floor.

According to a particular arrangement, the toothing is provided on the edges of said flanges of the female section, the lock consists of a plate, the longitudinal locking means are formed by a castellated part provided on one face of said plate and in that the side retaining means consist of side rims of said plate, trapping the female section teeth laterally.

The construction of the lock in the shape of a plate, incorporating the longitudinal locking means and the side retaining means, makes the fabrication of the lock easier and, besides, owing to its compact design, its resistance to various stresses is improved.

According to a specially advantageous embodiment, the lock consists of a plate comprising two rows of holes, into which said teeth fit, in the locked position. This embodiment actually amounts to interconnecting the above-mentioned castellated part and side rims, the plate holes being formed by the spaces between the teeth of said castellated part, the side rims and a central part of the plate, respectively, while the female section teeth fit into these spaces, substantially without either a longitudinal play or a side play, thus ensuring the keeping of spacing between both female section flanges.

Preferably, the lock traverses a window provided in the male section and is longitudinally retained and guided, perpendicularly to the lengthwise direction, between the edges of said window. Thus, longitudinal stresses are directly transferred from one channel section to the other one by the lock, without passing through intermediate members connecting the lock to the male section.

For a still better resistance to longitudinal stresses, the lock may comprise further locking means, for instance a third row of holes which, in the locked position, engage with further complementary teeth, provided on the male section. So said stresses are taken not only by the window edges but also by the whole toothing provided on the male section.

BRIEF DESCRIPTION OF THE DRAWINGS

Other features and advantages of the present invention will become more apparent upon reading the following detailed description of a motor vehicle seat rail, taken in conjunction with the accompanying drawings, wherein.

DETAILED DESCRIPTION OF THE INVENTION

Figure 1:
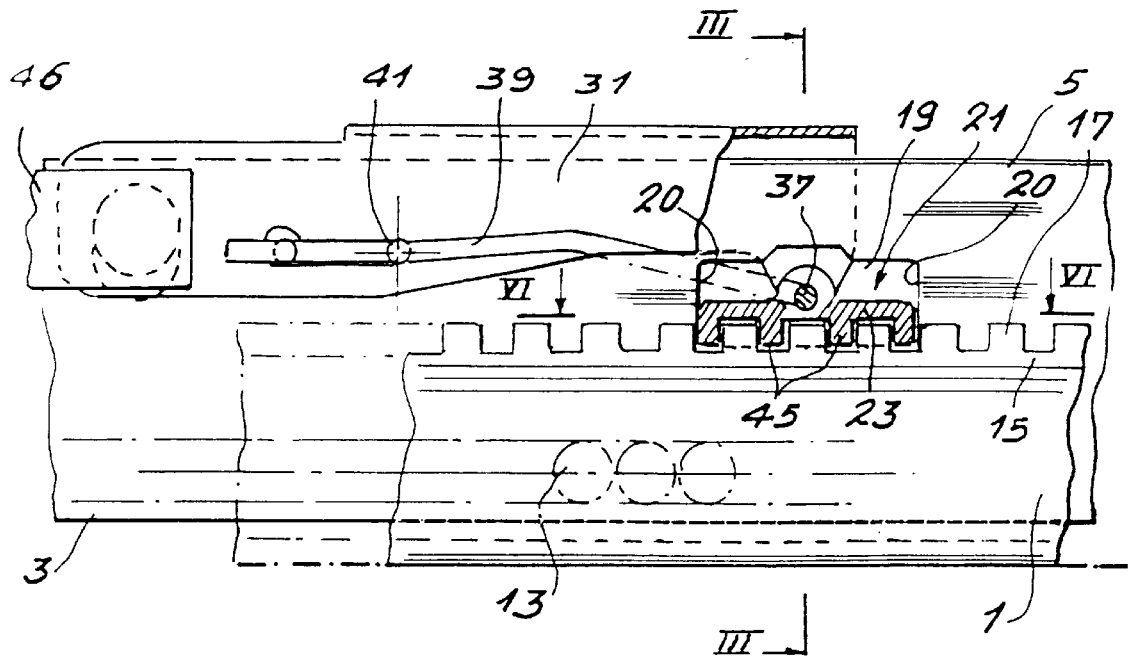
FIG. 1 is a partial side view of the slide rail and its locking system, in the locked position.

The slide rail comprises a female section 1, fastened to the vehicle floor, for instance with screws 2, and a male section 3, having an upper flange 5, which extends vertically upwards and on which the seat framework (not shown) is fixed, in a well known manner.

The female section, in the general shape of a U, open at the top, has two flanges 7 folded in towards one another and terminating in a hook-shaped downward bend 9, for retaining the male section 3 in the vertical direction.

The lower part of male section 3 is located between said flanges 7 and it can slide lengthwise in the female section 1, its side edges 11 being guided and retained using two rows of balls 13, and kept in the vertical position, in the case of tear stresses, by the female section hooks 9.

A row of teeth 17, evenly spaced apart and facing upwards, is formed on the upper edge 15 of each flange 7 of the female section, above the bend 9.

A window 19 is formed in the upper flange 5 of the male section 3.

A lock 21 is disposed in this window and it extends on either side of said upper flange 5, beyond both rows of teeth 17 of the female section, while being still vertically movable in said window, owing to its being guided between the vertical edges 20 of the latter.

Figure 3:
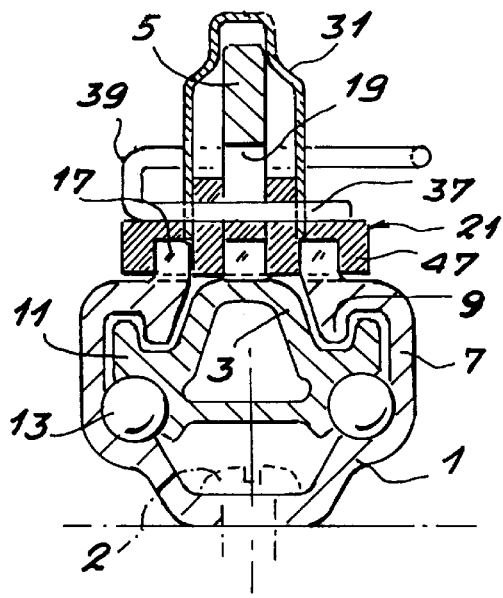
FIG. 3 is a sectional view taken along line III—III in FIG. 1.
Figure 4:
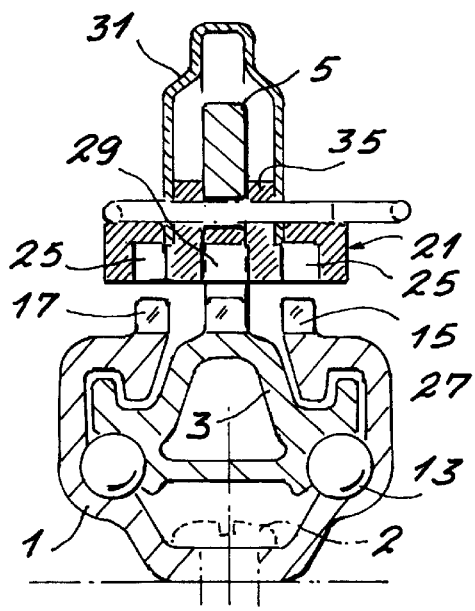
FIG. 4 is a sectional view taken along line IV—IV in FIG. 2.
Figure 5:
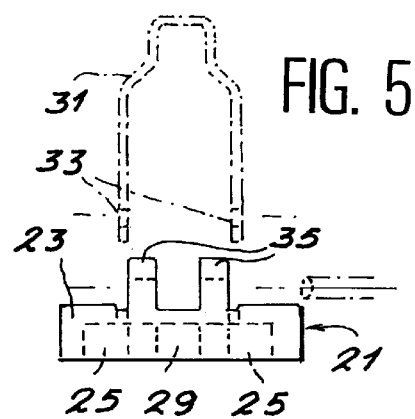
FIG. 5 is a front view of the lock, showing how it is mounted on the unlocking control arm.
Figure 6:
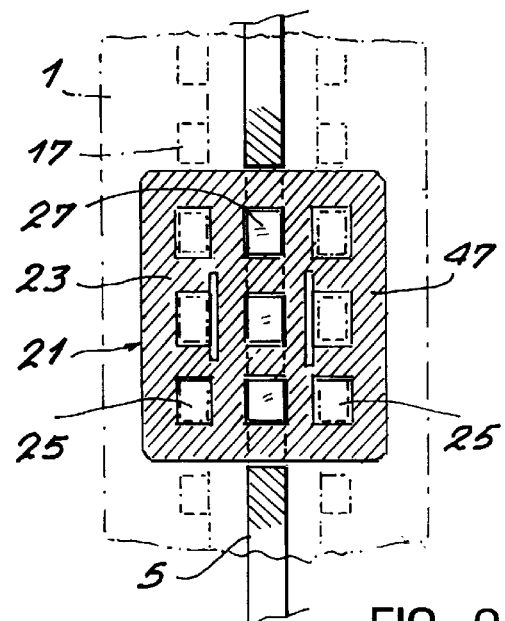
FIG. 6 is a top sectional view taken along line VI—VI in FIG. 1, at the locking system.
Figure 7:
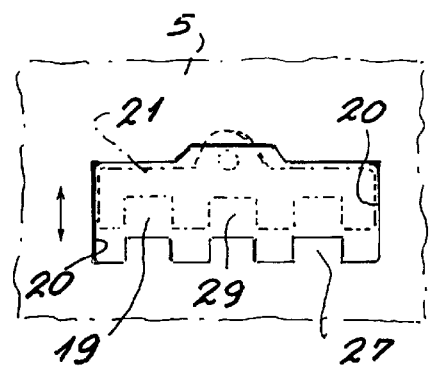
FIG. 7 is a detailed view of the window, provide in the male section and in which the lock is positioned.

Such lock consists of a plate 23, extending horizontally and provided with two rows of holes 25, the cross-section of which corresponds to the horizontal one of the teeth 17, and having the same pitch as the latter, in such a way that, in a locking position (FIGS. 1 and 3), the plate 23 covers the upper edges of the flanges of the female section 1, the teeth 17 of which fit into said plate holes 25.

Therefore, in such a locked position, the lock 21 locks the slide rail in the lengthwise direction, owing to the engagement of the castellated part 45, defined between holes 25, with the toothing 17, and moreover it prevents the flanges of the female section 1 from moving apart, since the edges 47 of the plate 23 trap said teeth laterally.

For a better strength of the locking system, as well as for reducing longitudinal thrust stresses between the lock 21 and the vertical edges 20 of the male section window 19, the lower edge of the window also includes teeth 27 which, in the locked position, fit into the holes 29 of a third row of holes, formed in plate 23 between the two rows of holes 25, thus constituting further locking means for the lock 21 on the male section 3.

The window 19 is high enough for allowing, when the lock is moved upwards, its full disengagement from the toothing 17 of the female section 1, so as to let the male section slide in the female section.

The vertical motion of the lock, between the locked position and the unlocked position, is controlled by an arm 31, pivoted on the upper flange 5 of the male section.

This arm 31, in the shape of a U in the cross-section, is fitted on the top of the upper flange 5 and has, at one end, two cheeks 33 extending downwards on either side of two lugs 35, formed on the upper face of the lock 21. A pin 37, inserted through said lugs 35 and said cheeks 33, serves as a connection between arm 31 and lock 21.

Preferably, as shown in the figures, pin 37 is the folded end of a spring 39 for returning the lock to the locked position. Such spring, adequately folded and inserted into the upper flange 5 of the male section through a slot 43, formed in the arm 31, is also used as a fulcrum pin (reference mark 41) for the arm 31 on the male section.

Figure 2:
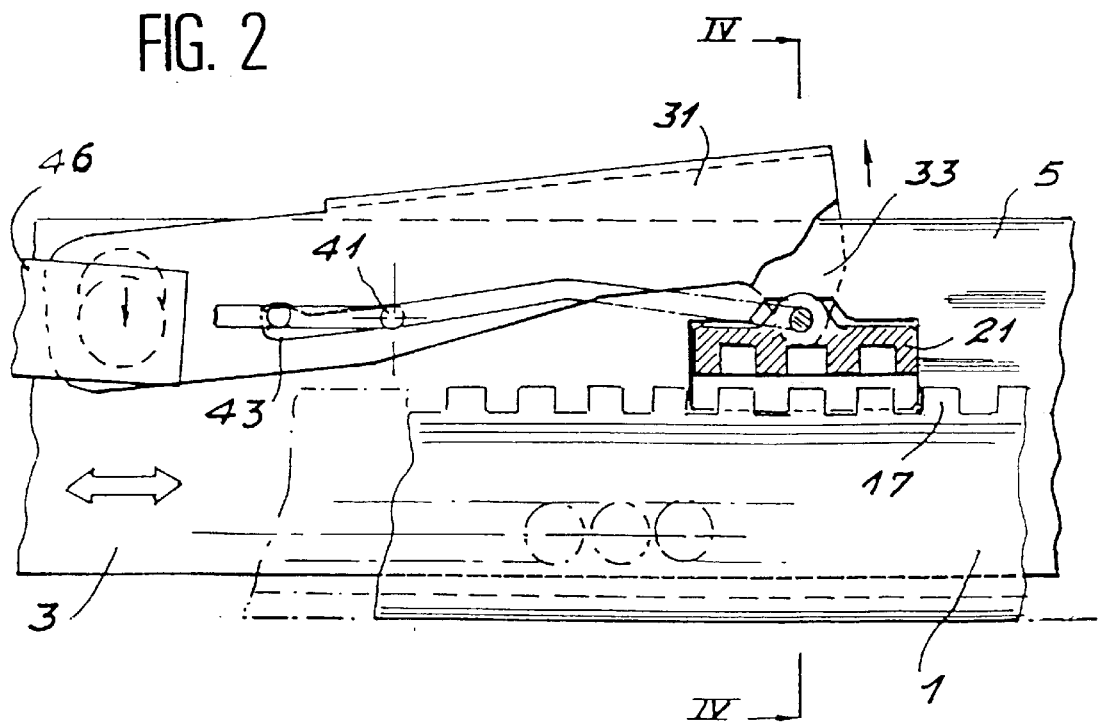
FIG. 2 is a corresponding view, in the unlocked position.

The swivelling motion of the arm is controlled, in a well known manner, by a compensation bar 46, only one end of which is shown in FIGS. 1 and 2.

The vertical motion of the lock and its spring return to the locked position could be carried out just as well using any other means obvious to those skilled in the art, such as a spring of some type pushing the lock downwards, and a pulling handle, arranged on the seat and connected to the lock by means of a cable, or a piano wire, so as to pull the lock upwards for the unlocking operation.

The male section toothing could be provided at a different level from that of the female section, in which case the lock shape and the arrangement of its holes should be adapted accordingly. Particularly, the male section toothing could have a greater height, so as to remain in gear with the lock, even after the latter is disengaged from the female section toothing by on upward motion.

The lock holes might also be through-holes, that is extending through the whole thickness of plate 23.

Last, instead of the above-described holes 25, as locking means for the lock, these could also be designed in the shape of a castellated structure 45, projecting from the plate surface and fitting into the female section toothing, the plate edges being then downward folded so as to form side rims 47, laterally trapping the female section toothing 17 so as to prevent its flanges from moving apart.

We claim:

1. Slide rail for a vehicle seat, comprising a female section in the shape of a U, having two flanges, and a male section sliding lengthwise between said flanges in said female section, and a lock for longitudinally locking the male section on the female section, wherein the female section comprises two rows of teeth, provided on each one of its flanges, respectively, said lock is connected, in the longitudinal direction, to the male section and includes longitudinal locking means arranged so as to cooperate in a locked position, with teeth of said two rows of teeth, for preventing a relative longitudinal movement of the male and female sections, and side retaining means formed in the lock, provided so as to trap, in said locked position, the female section flange edges, in order to keep said flanges from moving apart.

2. Slide rail for a vehicle seat, comprising a female section in the shape of a U, having two flanges, and a male section sliding lengthwise between said flanges in said female section, and a lock for longitudinally locking the male section on the female section, wherein the female section comprises two rows of teeth, provided on each one of its flanges, respectively, said lock is connected, in the longitudinal direction, to the male section and includes longitudinal locking means arranged so as to cooperate in a locked position, with teeth of said two rows of teeth, for preventing a relative longitudinal movement of the male and female sections, and side retaining means formed in the lock, provided so as to trap, in said locked position, the female section flange edges, in order to keep said flanges from moving apart, wherein the toothing is provided on the edges of said flanges of the female section, the lock consists of a plate, the longitudinal locking means are formed by a castellated part provided on one face of said plate and in that the side retaining means consist of side rims of said plate, trapping the female section teeth laterally.

3. Slide rail according to claim 1, wherein the toothing is formed on the edges of said flanges of the female section, in that the lock consists of a plate comprising two rows of holes, into which said teeth fit, in the locked position; the retaining means being lateral edges of the holes.

4. Slide rail according to claim 1, wherein the lock passes through a window formed in the male section and is retained longitudinally and guided perpendicularly to the lengthwise direction, between the edges of said window.

5. Slide rail according to claim 4, wherein the lock is carried by an arm hinged on the male section.

6. Slide rail for a vehicle seat, comprising a female section in the shape of a U, having two flanges, and a male section sliding lengthwise between said flanges in said female section, and a lock for longitudinally locking the male section on the female section, wherein the female section comprises two rows of teeth, provided on each one of its flanges, respectively, said lock is connected, in the longitudinal direction, to the male section and includes longitudinal locking means arranged so as to cooperate in a locked position, with teeth of said two rows of teeth, for preventing a relative longitudinal movement of the male and female sections, and side retaining means formed in the lock, provided so as to trap, in said locked position, the female section flange edges, in order to keep said flanges from moving apart;
- wherein the lock passes through a window formed in the male section and is retained longitudinally and guided perpendicularly to the lengthwise direction, between the edges of said window;
- wherein the lock is carried by an arm hinged on the male section; and
- wherein the arm has a U-shaped section which fits onto an upper flange of the male section, in which said window is formed.

7. Slide rail for a vehicle seat, comprising a female section in the shape of a U, having two flanges, and a male section sliding lengthwise between said flanges in said female section, and a lock for longitudinally locking the male section on the female section, wherein the female section comprises two rows of teeth, provided on each one of its flanges, respectively, said lock is connected, in the longitudinal direction, to the male section and includes longitudinal locking means arranged so as to cooperate in a locked position, with teeth of said two rows of teeth, for preventing a relative longitudinal movement of the male and female sections, and side retaining means formed in the lock, provided so as to trap, in said locked position, the female section flange edges, in order to keep said flanges from moving apart;
- wherein the lock passes through a window formed in the male section and is retained longitudinally and guided perpendicularly to the lengthwise direction, between the edges of said window;
- wherein the lock is carried by an arm hinged on the male section; and wherein it comprises a spring for returning the lock to the locked position, said spring being configured so as to serve as a swivel pin for the arm on the male section and as a connection of the lock to said arm.

8. Slide rail according to claim 1, wherein the lock includes further locking means which, in the locked position, engage with further complementary teeth arranged on the male section.

9. Slide rail according to claim 8, wherein said further locking means are formed by a third row of holes provided in the plate between said two.

10. A selectively lockable slide rail assembly for a vehicle seat comprising:
- an elongated female section having a generally U-shaped cross section with arm portions terminating outwardly in two longitudinally extending flanges;
- the flanges each having a row of teeth along a corresponding length thereof;
- a male section slidingly mounted in the female section for longitudinal movement within the female section and between the flanges;
- longitudinal locking means for selectively engaging the teeth along the flanges for locking together the male section and the female section to prevent longitudinal movement of the male section relative to the female section;
- the locking means including side retaining means for contacting the flanges when the locking means selectively engage the teeth thereby preventing the flanges from flaring; and
- means for selectively unlocking the locking means to allow longitudinal displacement of the male section relative to the locking means.

11. The apparatus set forth in claim 10 wherein the teeth extend from outer edges of the flanges; and further wherein
a) the locking means is a plate having castellated portions located on a first side thereof; and
the side retaining means are surfaces formed in the plate for laterally engaging the female section teeth.

12. The apparatus set forth in claim 10 wherein each row of teeth extends from an outward edge of a corresponding flange; and further wherein the locking means is a plate having first and second rows of recesses formed in a surface thereof for receiving corresponding rows of teeth when the locking means is in a locked position.

13. The apparatus set forth in claim 10 wherein the male section has a window formed therein through which the locking means passes for continuous contact with edges of the window thereby restraining longitudinal movement of the locking means while guiding movement of the locking means perpendicularly of a longitudinal direction of the male section.

14. The apparatus set forth in claim 13 wherein the locking means is mounted to an arm, the arm being hinged to the male section.

15. The apparatus set forth in claim 14 wherein the locking means is connected to a first end of the arm which has a generally U-shaped cross section, an intermediate section of the arm embracing an upper flange section of the male section in which the window is formed.

16. The apparatus set forth in claim 14 further comprising a spring that biases the locking means in a locked position, the spring configured to serve as a swivel pin for the arm hinged to the male section and simultaneously as a connector between the lock and the male section.

17. The apparatus set forth in claim 10 together with engaging means comprising means located on the locking means for engaging a correspondingly positioned row of teeth that extends from the male section when the locking means is in the locked position.

18. The apparatus set forth in claim 12 together with engaging means comprising:
- means located on the plate for engaging a correspondingly positioned row of teeth that extends from the male section when the locking means is in the locked position;
- the engaging means having a third row of recesses formed in the plate and located between the first and second rows of the plate recesses.

* * * * *